(12) United States Patent
Altus (10) Patent No.: US 12,154,445 B2
(45) Date of Patent: Nov. 26, 2024

(54) COLLABORATIVE TRAFFIC MANAGEMENT

(71) Applicant: THE BOEING COMPANY, Chicago, IL (US)

(72) Inventor: Stephen S. Altus, Campbell, CA (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 17/741,308

(22) Filed: May 10, 2022

(65) Prior Publication Data

US 2023/0368681 A1 Nov. 16, 2023

(51) Int. Cl.
*G08G 5/06* (2006.01)
*G06Q 10/047* (2023.01)
*G06Q 50/40* (2024.01)
*G08G 5/00* (2006.01)

(52) U.S. Cl.
CPC ........... *G08G 5/065* (2013.01); *G06Q 10/047* (2013.01); *G06Q 50/40* (2024.01); *G08G 5/0039* (2013.01)

(58) Field of Classification Search
None
See application file for complete search history.

(56) References Cited

U.S. PATENT DOCUMENTS

| | | |
|---|---|---|
| 2007/0032940 A1 | 2/2007 | Villiers |
| 2009/0112645 A1* | 4/2009 | Jha .................. G06Q 10/10 705/7.12 |
| 2021/0295717 A1* | 9/2021 | Zammit-Mangion ....................... G05D 1/0011 |

FOREIGN PATENT DOCUMENTS

EP 2749984 A2 7/2014

OTHER PUBLICATIONS

Zhang et al., "A Hierarchical Flight Planning Framework for Air Traffic Management", Proceedings of the IEEE, vol. 100, Issue 1, Sep. 6, 2011, pp. 179-194 (Year: 2011).*
European Patent Office, extended European Search Report for Application 23172223.2-1009 dated Sep. 29, 2023.
Delahaye et al. 1994, Genetic Algorithms for Air Traffic Assignment, in Proceedings of European Conference On Artificial Intelligence.
Alliot et al. 1993, Genetic Algorithms for Solving Air Traffic Control Conflicts, in Proceedings of 9th IEEE Conference on Artificial Intelligence for Applications.
Li, et al., 2016, Network-wide flight trajectories planning in China using an improved genetic algorithm, in IEEE/AIAA 35th Digital Avionics Systems Conference (DASC) [Abstract Only].

(Continued)

*Primary Examiner* — Tamara L Weber
(74) *Attorney, Agent, or Firm* — Joseph M. Butscher; The Small Patent Law Group LLC (57) ABSTRACT

The present disclosure provides for identifying several solutions that meet an arbiter's optimization goals and allowing the potential assignees the ability to identify which candidate solution is the best from the perspective of the aggregate assignees (rather than the arbiter's perspective or one assignee's perspective). The present disclosure provides this by calculating a plurality of optimization solutions based on transit requests, providing the plurality of optimization solutions to various entities, receiving ranked selections of the plurality of optimization solutions, and assigning resources based on a highest ranked optimization solution of the plurality of optimization solutions.

20 Claims, 8 Drawing Sheets

(56) References Cited

OTHER PUBLICATIONS

Yan et al., 2017, A multi-objective multi-memetic algorithm for network-wide conflict-free 4D flight trajectories planning, in Chinese Journal of Aeronautics.
Mondoloni, AIAA-98-4476, A genetic Algorithm for determining optimal flight trajectories. [Abstract Only].

* cited by examiner

COLLABORATIVE TRAFFIC MANAGEMENT

Aspects of the present disclosure relate to traffic control and management. More particularly, the present disclosure provides systems and methods for using collaborative information received from a variety of interested actors to calculate several optimization solutions that assign resources to the variety of interested actors while also providing equality and parity among the interested actors.

BACKGROUND

Airspace is a limited resource where only a select number of aircraft are allowed within a certain airspace volume over a given time. Air traffic management (ATM) authorities are tasked with maximizing the use of the airspace while also staying within traffic constraints such as safe distances between aircraft in the airspace, etc. As ATM authorities assign airspace to aircraft, the authorities and associated ATM systems have only limited or no insight or knowledge of each aircraft operator's objectives when requesting access to the airspace for their respective aircraft.

For example, the aircraft operator's request for a flight plan through the airspace may be based on a variety of factors that affect the overall operator operations, where a denial of airspace or a significant change to the flight plan through the airspace by the ATM authority may cause large scale disruption through the overall flight operations of the aircraft operator. Iterative optimization where the aircraft operator and ATM authority negotiate various flight plan permissions results in complicated and computationally intractable operations without guaranteeing that the aircraft operators objectives are adequately met and that the airspace is fully utilized.

SUMMARY

The present disclosure provides a method in one aspect, the method including: receiving first transit requests from a first entity and second transit requests from a second entity that includes a conflict with the first transit requests, calculating a plurality of optimization solutions based on the first transit requests and the second transit requests to resolve the conflict, and providing the plurality of optimization solutions to the first entity and the second entity. The method also includes receiving first ranked selections of the plurality of optimization solutions from the first entity and second ranked selections of the plurality of optimization solutions from the second entity, and assigning resources to the first entity and the second entity based on a highest ranked optimization solution of the plurality of optimization solutions according to a combination of the first ranked selections and the second ranked selections. Other embodiments of this aspect include corresponding computer systems, apparatus, and computer programs recorded on one or more computer storage devices, each configured to perform the actions of the methods.

In one aspect, in combination with any example method above or below, the method where the first transit requests and the second transit requests are received in response to a disrupting event affecting a pre-existing assignment plan, where the first transit requests suggest adjustments to resources under control of the first entity affected by the disrupting event and the second transit requests suggest adjustments to resources under control of the second entity affected by the disrupting event.

In one aspect, in combination with any example method above or below, the method where calculating the plurality of optimization solutions is performed under a time limit based on the disrupting event and the pre-existing assignment plan.

In one aspect, in combination with any example method above or below, the method where the plurality of optimizations solutions are different solutions for one optimization function. The plurality of optimizations solutions are solutions from a corresponding plurality of optimization functions.

In one aspect, in combination with any example method above or below, the method where the combination of the first ranked selections and the second ranked selections is performed via a ranked choice voting schema.

In one aspect, in combination with any example method above or below, the method where the first ranked selections may include selections from the first entity ranked according to a first preference schema and where the second ranked selections may include selections from the second entity ranked according to a second preference schema.

The present disclosure provides a system in one aspect. The system includes a processor, a memory storage device including instructions that when executed by the processor enable performance of an operation. The operation may include: receiving first transit requests from a first entity and second transit requests from a second entity that include a conflict with the first transit requests, calculating a plurality of optimization solutions based on the first transit requests and the second transit requests to resolve the conflict, and providing the plurality of optimization solutions to the first entity and the second entity. The operation may also include receiving first ranked selections of the plurality of optimization solutions from the first entity and second ranked selections of the plurality of optimization solutions from the second entity, and assigning resources to the first entity and the second entity based on a highest ranked optimization solution of the plurality of optimization solutions according to a combination of the first ranked selections and the second ranked selections.

In one aspect, in combination with any example system above or below, the system where the first transit requests and the second transit requests are received in response to a disrupting event affecting a pre-existing assignment plan, where the first transit requests suggest adjustments to resources under control of the first entity affected by the disrupting event and the second transit requests suggest adjustments to resources under control of the second entity affected by the disrupting event.

In one aspect, in combination with any example system above or below, the system calculating the plurality of optimization solutions is performed under a time limit based on the disrupting event and the pre-existing assignment plan.

In one aspect, in combination with any example system above or below, the system where the plurality of optimizations solutions are different solutions for one optimization function.

In one aspect, in combination with any example system above or below, the system where the plurality of optimizations solutions are solutions from a corresponding plurality of optimization functions.

In one aspect, in combination with any example system above or below, the system where the combination of the first ranked selections and the second ranked selections is performed via a ranked choice voting schema.

In one aspect, in combination with any example system above or below, the system where the first ranked selections may include selections from the first entity ranked according to a first preference schema and where the second ranked selections may include selections from the second entity ranked according to a second preference schema. Implementations of the described techniques may include hardware, a method or process, or computer software on a computer-accessible medium.

The present disclosure provides a computer program product in one aspect, the computer program product including a computer-readable storage medium having computer-readable program code embodied therewith, the computer-readable program code executable by one or more computer processors to perform an operation. The operation may include: receiving first transit requests from a first entity and second transit requests from a second entity that include a conflict with the first transit requests, calculating a plurality of optimization solutions based on the first transit requests and the second transit requests to resolve the conflict, and providing the plurality of optimization solutions to the first entity and the second entity. The operation may also include receiving first ranked selections of the plurality of optimization solutions from the first entity and second ranked selections of the plurality of optimization solutions from the second entity, and assigning resources to the first entity and the second entity based on a highest ranked optimization solution of the plurality of optimization solutions according to a combination of the first ranked selections and the second ranked selections.

In one aspect, in combination with any example computer program product above or below, where the first transit requests and the second transit requests are received in response to a disrupting event affecting a pre-existing assignment plan, where the first transit requests suggest adjustments to resources under control of the first entity affected by the disrupting event and the second transit requests suggest adjustments to resources under control of the second entity affected by the disrupting event.

In one aspect, in combination with any example computer program product above or below, where the plurality of optimizations solutions are different solutions for one optimization function.

In one aspect, in combination with any example computer program product above or below, where the plurality of optimizations solutions are solutions from a corresponding plurality of optimization functions.

In one aspect, in combination with any example computer program product above or below, where the combination of the first ranked selections and the second ranked selections is performed via a ranked choice voting schema.

In one aspect, in combination with any example computer program product above or below, where the first ranked selections may include selections from the first entity ranked according to a first preference schema and where the second ranked selections may include selections from the second entity ranked according to a second preference schema.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure relates to systems and methods for assigning limited resources to requesting entities. While examples described herein relate to air traffic and airspace, the systems and methods described herein may be utilized in a variety of applications, such as traffic management of land, rail, or water based vehicles as well as other systems, which assign limited discrete resources to requesting entities.

ATM authorities/entities utilize ATM systems to receive requests for airspace and to assign airspace resources to aircraft flying through a given airspace. Resources may include a given four dimensional (4D) assignment (e.g., an assignment of latitude, longitude, altitude, and time) of a given path through the airspace managed by the ATM system. The ATM system typically operates to ensure that the airspace is utilized effectively (e.g., that unused airspace is not left unassigned when it could be used by an aircraft).

Previously, there were no standard methods to optimize the flow of all aircraft in an airspace subject to the operational objectives and constraints of the aircraft operators as well as ensuring that the airspace is managed effectively by the ATM system. This lack of optimization is primarily because an ATM authority does not have knowledge of each aircraft operator's objectives for a given aircraft in the airspace. Furthermore, an operator's objectives must be applied across all flights for that operator and not just on an individual flight basis. For example, costs for an aircraft operator of different options for operating an individual aircraft flight depends on the details of how other flights are operated (because the various other flights share and/or exchange aircraft, crew, payload, and/or ground resources).

Moreover, because of the complexity of cost models and dependence on other flights, it is prohibitively computationally expensive for an operator to optimize repeatedly over their entire flight operation. Consequently, for the ATM system to outsource the optimization to the aircraft operators via iterative optimization between the parties using a system-of-systems approach is computationally intractable. For example, the optimization via this method would likely not converge or converge too slowly for operational use in an ATM system.

The systems and methods described herein provide for an ATM system that optimizes the assigned flight paths of all aircraft in a certain airspace volume, with an objective function and provides a collaborative ranking and assignment process to implement improved capacity, efficiency, and robustness while maintaining fairness among various aircraft operators.

In some examples, the ATM system determined a number of the near-optimum solutions and distributes the solutions to aircraft operators or airspace user organizations (e.g., airlines, etc.). The aircraft operators evaluate the provided solutions per their own operational objectives (e.g., cost, operational robustness such as assured payload delivery, etc.), and using multidisciplinary analyses (considering aircraft, crew, payload, and fuel). In some examples, the solutions provided by the ATM system are complete (i.e., each one defines the 4D paths of all flights together, not treating flights individually), thus network effects considering payload and resource connectivity can be fully considered by the aircraft operators. The airspace users respond to the ATM system with ranked-choice voting of the proposed solution. The ATM authority selects a solution based on the ranked selections and assigns the airspace resources according to the selected solution, as described in more detail in relation to FIGS. 1A-6 herein.

Although the examples given herein are primarily given in relation to aircraft flight schedules contesting for access to airspace, the present disclosure can be used in a variety of environments in which channels are contested by multiple parties, including, but not limited to: wireless or wired data transmission over contested transmission media, vehicle navigation and logistics in the water or land, pipeline flow management, and the like.

By identifying several solutions that meet an arbiter's optimization goals and allowing the potential assignees the ability to identify which candidate solution is the "best" from the perspective of the aggregate assignees (rather than the arbiter's perspective or one assignee's perspective), the present disclosure provides for faster optimization calculations, cross-objective optimization (where the arbiter optimized for feature X and the parties select the "best" candidate based on feature Y) without including multiple objectives in a single optimization model, and reduces the amount of back-and-forth communications currently used to resolve conflicts in resource assignment.

Figure 1A:
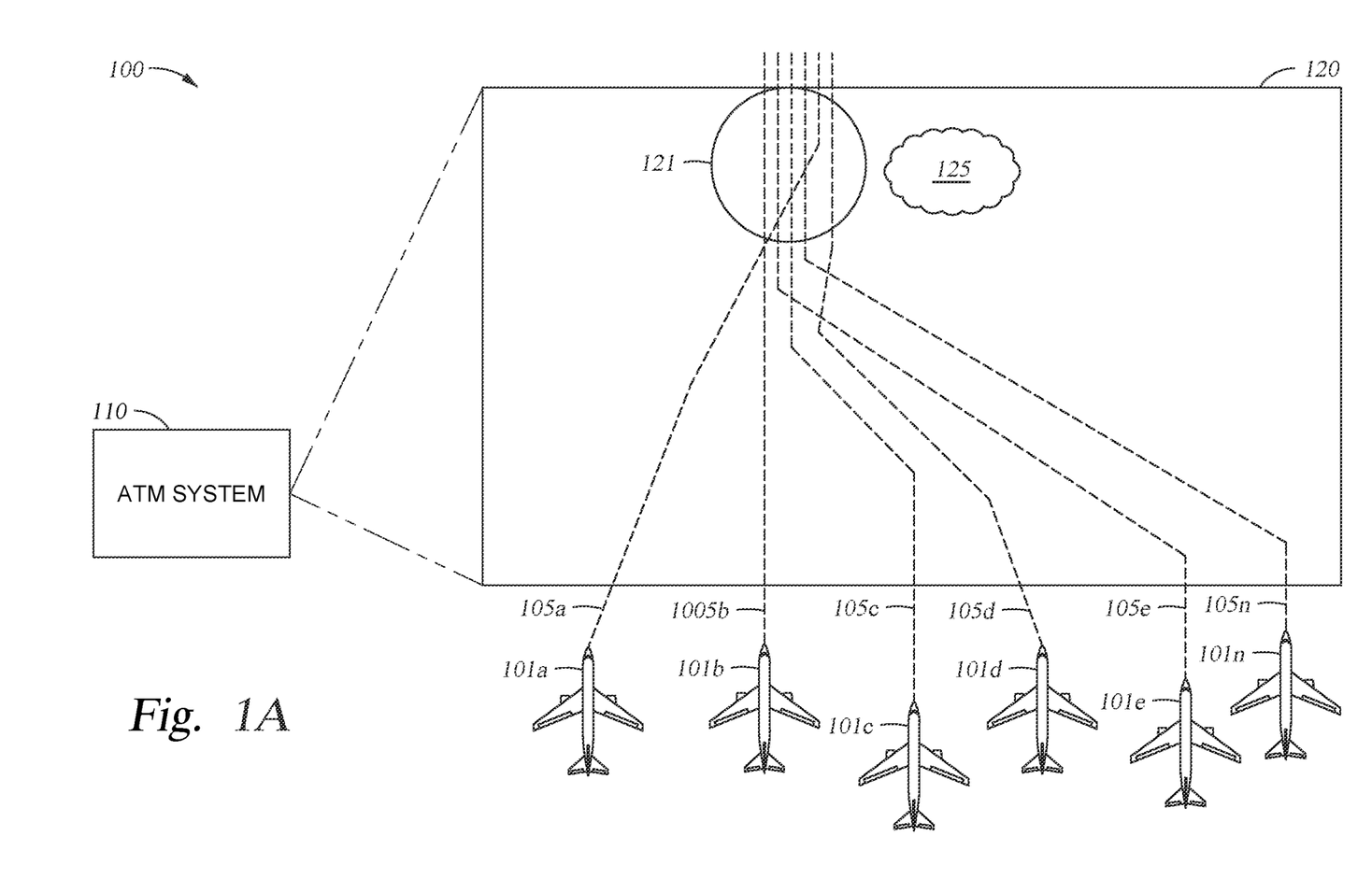
FIG. 1A depicts example aircraft flight plan requests in a first scenario, according to aspects of the present disclosure.

FIG. 1A depicts example aircraft flight plan requests in a first scenario, scenario 100, according to aspects of the present disclosure. The scenario 100 depicts an airspace 120 controlled or managed by an ATM system 110 which receives flight plan requests from aircraft and assigns portions of the airspace to the requesting aircraft. In the scenario 100, aircraft 101a—aircraft 101n each provide a desired flight path through the airspace 120 to the ATM system 110.

Each of the aircraft 101a—aircraft 101n provide associated flight path requests, flight plan requests 105a-105n, to the ATM system 110 and wait for an flight plan assignment and clearance from the ATM system 110. In some examples, the aircraft 101a-101n provide the flight path requests to the ATM system prior to entering the airspace 120. For example, the aircraft 101a-101n provide flight path requests to the ATM system 110 prior to take off from a departure point (such as an airport). In another example, the aircraft 101a-101n provide the flight path requests to the ATM system 110 during flight and prior to entering the airspace 120, such as when the aircraft are entering an the airspace 120 from an airspace controlled by a different ATM authority from the authority associated with the ATM system 110.

In some examples, aircraft 101a-101n sent flight plan requests to the ATM system 110 in response to an airspace event 125. For example, the airspace event 125 may include weather events, such as a thunderstorm, heavy turbulence potential, or other weather events that can close portions of the airspace 120. The airspace event 125 may also include other events, such as a flight restrictions, or other events that limit flight operations within a portion of the airspace 120.

In some examples, the flight plan requests 105a-105n all pass through a constrained area 121 of the airspace 120 at a given first time. In some examples, various restrictions and constraints for the constrained area 121 require that the ATM system 110 assign only a subset of the flight plan requests and aircraft 101a-101n to avoid overcrowding or other use constraints in the airspace. In some examples, the ATM system 110 may assign the aircraft to flight plans using a non-collaborative or non-optimized assignment method, such as shown in scenario 150 in FIG. 1B.

Figure 1B:
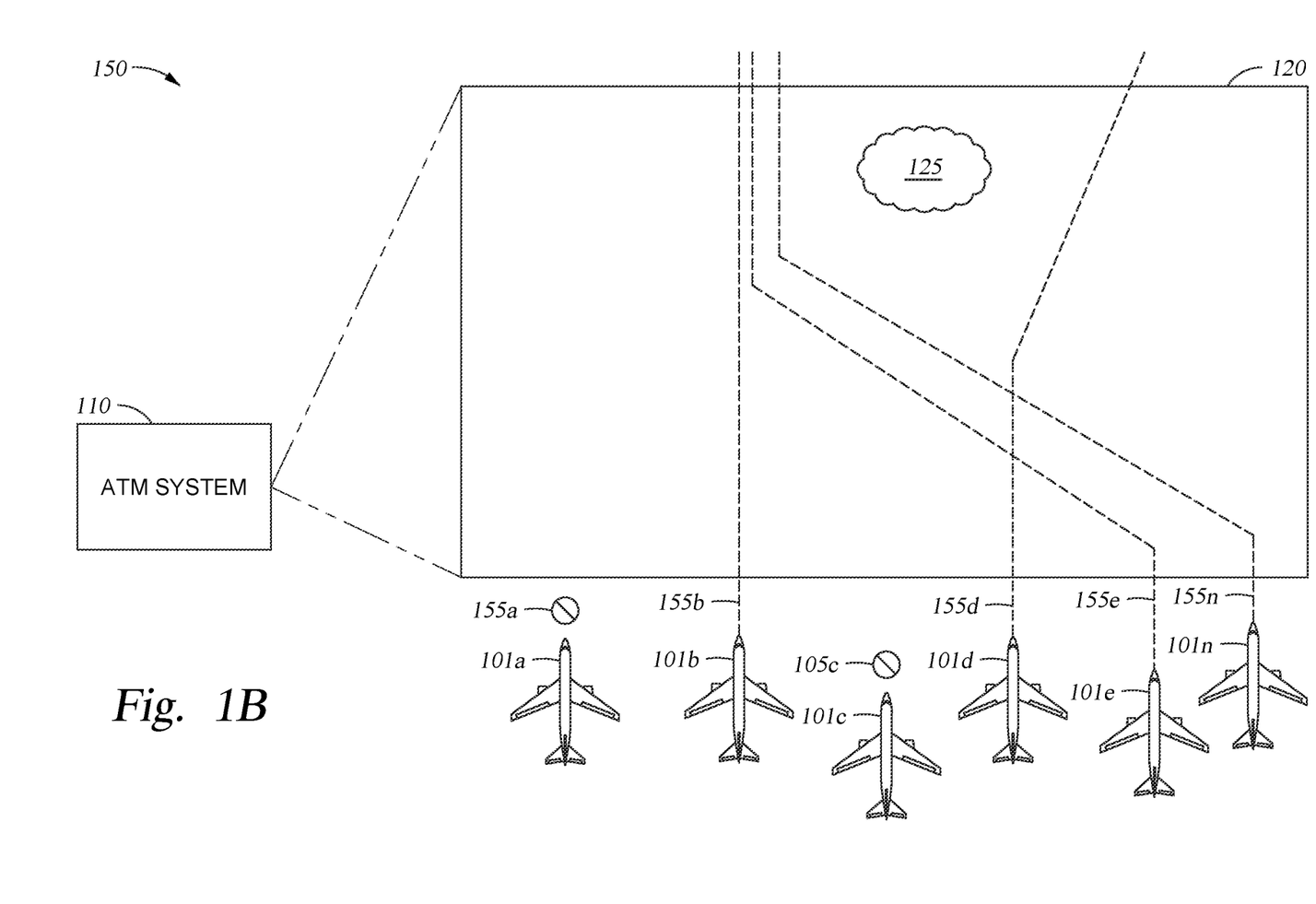
FIG. 1B depicts example aircraft flight plan assignments in a second scenario, according to aspects of the present disclosure.

FIG. 1B depicts example aircraft flight plan assignments in a second scenario, scenario 150, according to aspects of the present disclosure. In the scenario 150, the ATM system 110 assigns flight plans 155a-155n to the corresponding aircraft in response to the flight requests received in the scenario 100. In this example, the aircraft 101a and 101c are not permitted to conduct flight plans through the airspace 120 during a time associated with the scenario 150. In some examples, the ATM system 110 prevents congestion in the airspace and the constrained area 121 by preventing the aircrafts 101a and 101c from conducting flight operations in the airspace 120 during the time associated with the scenario 150, thus assigned flight plans 155a and 155b are not allowed. In some examples, since the aircrafts 101a and 101c are not allowed to conduct flight operations in the airspace 120 during the time associated with the scenario 150, the associated flights may then be delayed or cancelled by the aircraft operators or the aircraft may be rerouted to a different airspace by the aircraft operators.

The aircraft 101b, 101e, and 101n are assigned the flight plans 155b, 155e, and 155n, respectively. In some examples, the aircraft 101b, 101e, 101n are assigned the flight paths request by the respective aircraft in the scenario 100. In this example, the aircraft 101b, 101d, and 101e operate as expected by the airline operators of the respective aircraft. The ATM system 110 assigns the flight plan 155d to the aircraft 101d, where the flight plan 155d is an alternate path compared to the flight path request 105d requested by the aircraft 101d. In some examples, the flight plan 155d may introduce delays to the associated flight for the aircraft 101d. The scenario 150 may provide some airline operators with on-time and requested performance (e.g., aircraft 101b, 101e, and 101n) while other airline operators experience delays or cancellations (e.g., aircraft 101a, 101c, and 101d). In order to provide both better utilization of the airspace 120 and more fairness across the aircraft 101a-101n and associated operators the ATM system 110 calculates and selects optimized solutions as described in relation to FIG. 1C.

Figure 1C:
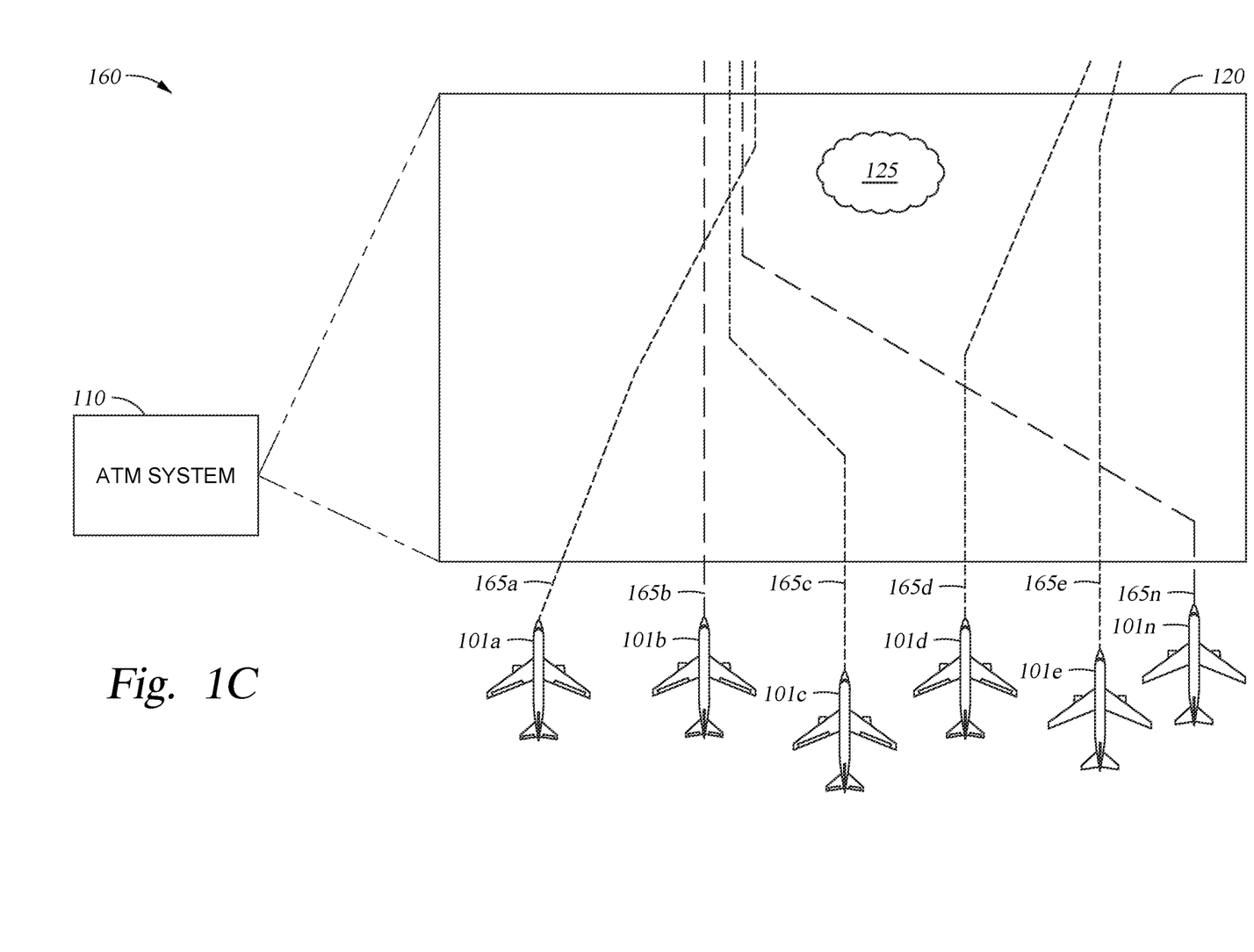
FIG. 1C depicts example aircraft flight plan assignments in a third scenario, according to aspects of the present disclosure.

FIG. 1C depicts example aircraft flight plan assignments in a third scenario, scenario 160, according to aspects of the present disclosure. In the scenario 160, the ATM system 110 calculates a plurality of optimization solutions based on the transit plans or flight plan requests received in the scenario 100, where each of the plurality of optimization solutions resolve the conflict caused by the constrained area 121. In some examples, the ATM system 110 provides the calculated optimization solutions to the aircraft 101a-101n and receives a ranked choice selection from the aircraft as described in more detail in relation to FIGS. 2, 3, and 5. The ATM system 110 assigns flight plans 165a-165n to the corresponding aircraft in response to receiving ranked selections from the aircraft 101a-101n.

In scenario 160, the aircraft 101a and 101c are the only aircraft that receive the requested flight path with assigned flight plans 165a and 165c. The aircraft 101d and 101e are assigned alternate flight paths in the flight plans 165d and 165e. The aircraft 101b and 101n are assigned respective flight plans, flight plans 165b and 165n, where the flight plans 165b and 165n are moderately delayed flight plans. For example, the aircraft 101b and 101n are not required to cancel the respective flights but agree to a slight delay before conducting flight operations in the airspace 120. For each of the aircraft, the assigned flight plan is a flight plan that was present in the ranked selections received by the ATM system 110, and provides some level of a good solution to the individual aircraft. For example, the aircraft 101d assigned to flight plan 165d may experience some delay via a longer flight path or route, but the delay may be within an acceptable margin for the aircraft operator of the aircraft 101d as reflected in the ranked selection provided to the ATM system 110 described in more detail in relation to FIG. 2. In some examples, the aircraft operator for the aircraft 101a may use various operator parameters and priorities to select from optimization solutions as described in relation to FIG. 2.

Figure 2:
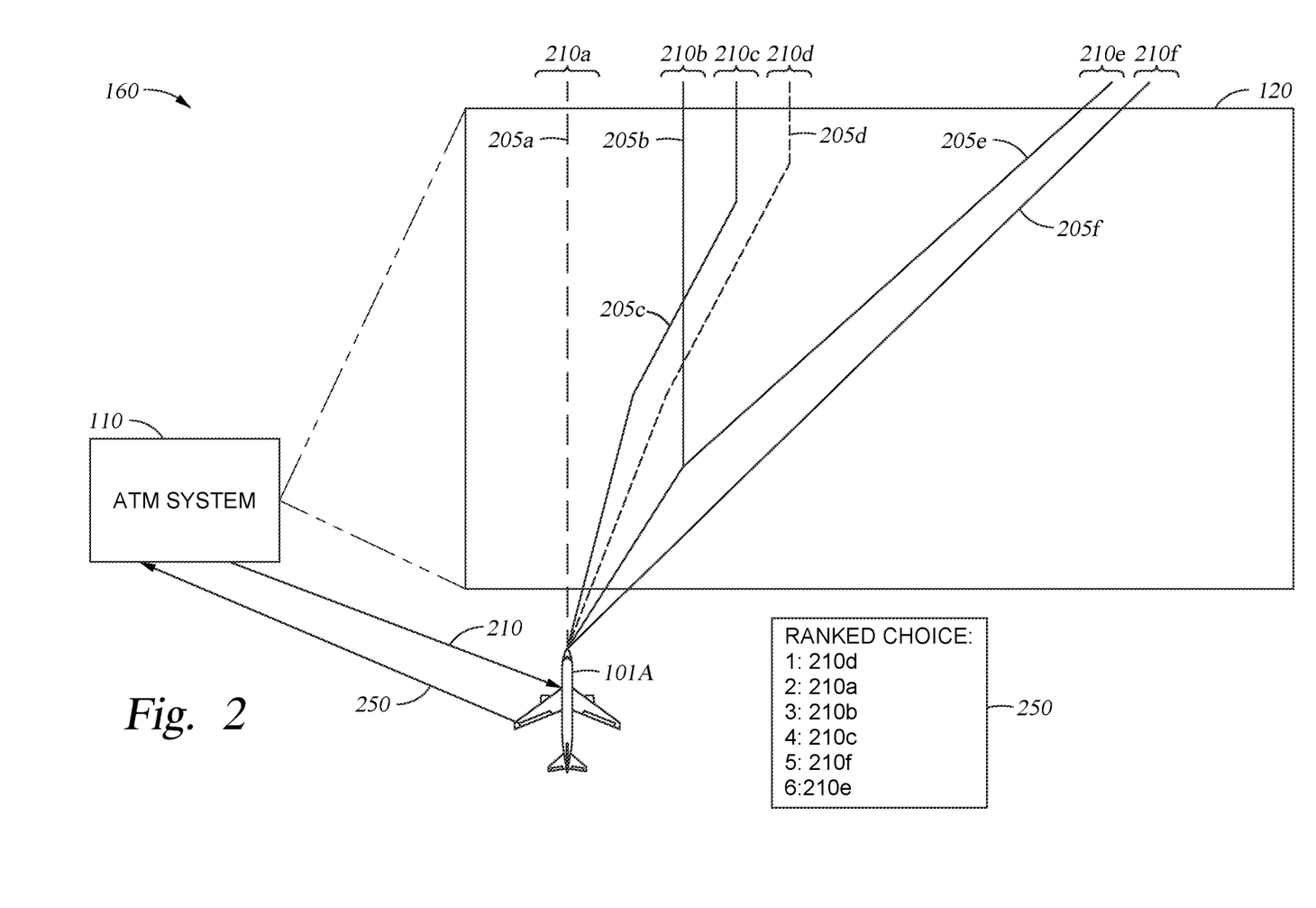
FIG. 2 depicts example aircraft flight plan optimization solutions for an aircraft, according to aspects of the present disclosure.

FIG. 2 example aircraft flight plan optimization solutions for the aircraft 101a, according to aspects of the present disclosure. The ATM system 110 provides the optimization solutions 210a-210f to the aircraft 101a. In some examples, the optimization solutions 210a-210f include respective flight path assignments, flight paths 205a-205f for the aircraft 101a. For example, the optimization solution 210a includes the flight path 205a, the optimization solution 210b includes the flight path 205b, etc. While not shown in FIG. 2, each of the optimization solutions 210a-210f calculated by the ATM system 110 includes corresponding flight paths for each of the requesting aircraft for the airspace 120, such as the aircraft 101a-101n described in relation to FIGS. 1A-1C. In some examples, the optimization solution provided to each aircraft only includes the flight paths for the aircraft. For example, the optimization solutions 210a-210f provided to the aircraft 101a only include the related flight paths options for the aircraft 101a, such as the flight path 205a-205f.

In some examples, the aircraft operator of the aircraft 101a may analyze the various options provide by the optimization solutions 210a-210f. For example, the aircraft operator may determine that the flight path 205d (the originally requested flight path) is preferred, but that flight paths 205a, 205e, and 205f are flight paths that also meet the aircraft operator's specific parameters and objectives for the flight operations of the aircraft 101a. For example, while flight paths 205e and 205f are different flight paths from the originally requested flight path, the flight paths 205e and 205f have a similar arrival time for the aircraft 101a to a destination.

In some examples, the aircraft operator may desire to prioritize arrival time to avoid affecting overall operations of the aircraft operation. For example, passengers traveling to a hub airport on the aircraft 101a may need to connect to other flights operated by the aircraft operation. The aircraft operator determined from the various flight plan options that some flight plans such as flight path 205a, flight path 205b, and flight path 205c, may result in varying amount of delays in the flight operations (e.g., a takeoff delay, or delays in flight, etc.). The flight paths 205e and 205f may require expending more fuel during flight operations, but provide close to on-time arrival times. In an example, where the aircraft operator prioritizes the arrival time or avoiding delays, the flight paths 205e and 205f are preferred by the aircraft operator over the flight paths 205a-205c.

In another example, the flight operations of the aircraft 101a may tolerate some delay in the flight operations. For example, when the aircraft operator is a shipping company, the flight operations of aircraft 101a may tolerate some delay in the flight operations of the aircraft 101a without significantly affecting the overall operations of the airline operator. In this example, the takeoff delay associated with the flight path 205a, or the in-flight delays associated with flight paths 205b and 205c may be preferred over the flight paths 205e and 205f where the flight path 205a results in fuel savings etc. for the aircraft 101a.

When the aircraft operator has determined which of the optimization solutions 210a-210f are preferred, the aircraft operator returns a ranked selection 250, which includes a ranked choice of the optimization plans to the ATM system 110. For example, the aircraft operator for the aircraft 101a returns the ranked selection 250 that ranks the optimization plans 210 in order from most preferred to least preferred (e.g., 210d, 210a, 210b, 210c 210f, 210e). The processes for communication between the ATM system 110 and the aircraft operators are described in more detail in relation to FIGS. 3-5.

Figure 3:
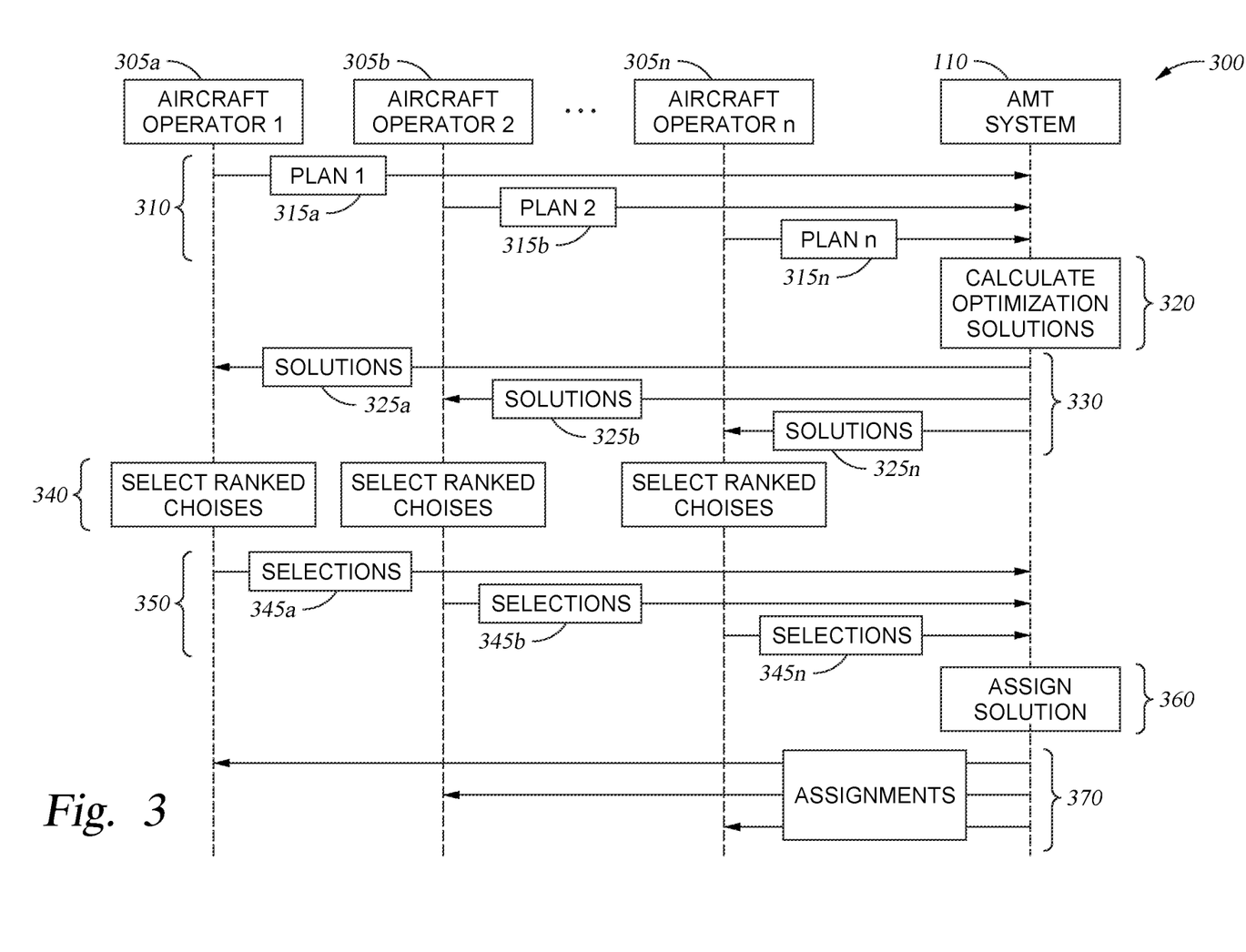
FIG. 3 is an example system flow diagram for collaborative traffic management, according to aspects the present disclosure.

FIG. 3 is an example system flow diagram for collaborative traffic management, according to aspects the present disclosure. In some examples, aircraft operators 305a-305n communicate with the ATM system 110 via associated aircraft. For example, the aircraft operators provide the flight plan requests 315a-315n (and ranked selections 335a-335n) via associated aircraft. For example, the aircraft 101a shown in FIG. 1A and associated with aircraft operator 305a sends the flight plan request 315a (and the ranked selection 335a) directly to the ATM system 110 via an onboard communication system etc. In another example, the aircraft operator 305a communicates with the ATM system 110 without communicating via the aircraft 101a such that the requests, selections, and assignments are communicated to an external system associated with the aircraft operator 305a and a flight plan assignment is communicated to the aircraft 101a by the aircraft operator system.

System flow 300 begins at step 310 where the ATM system 110 receives flight plan requests 315a-315n from aircraft operators 305a-305n. In some examples, the flight plan requests 315a-315n include 4D flight paths through the airspace 120 shown in FIG. 1A, including times and other information related to the intended or request flight operations of the respective aircraft in the airspace 120.

At step 320, the ATM system calculates a plurality of optimization solutions 325 based on flight plan requests. In some examples, the ATM system 110 first determines whether all requested flight paths in the flight plan requests 315a-315n can be accommodated/permitted by the ATM system 110 and the airspace 120. In most examples, the ATM system 110 cannot assign the flight plans as requested due to overlap of flight paths among aircraft etc. (e.g., each aircraft operator requests a same/similar most efficient flight path through constrained area 121 shown in FIG. 1A).

In an example where there are conflicts among the flight plan requests, the ATM system 110 solves an optimization problem where the objective function includes several objective factors such as balancing controller workload, balancing runway use, balancing buffers in separation, among others. These objective factors may include keeping operator paths as close as possible to the paths in the received requests, maintaining equity amongst operators (e.g., keeping similar estimated delays, estimated increased fuel costs, etc. among the various aircraft operators), and other factors. In some examples, the ATM system 110 also utilizes constraints in calculating solutions such as maintaining capacity for the airspace 120 at or above demand for all 4D airspace time-volumes. In some examples, the ATM system 110 uses the various inputs, objective factors, and constraints in an optimization algorithm to determine solutions. For example, the ATM system 110 may use a genetic algorithm process or other metaheuristic, which provides various optimized solutions, such as optimized flight path solutions.

In some examples, ATM system 110 calculates multiple distinct "good" solutions, rather than a single optimal solution. While a single optimal solution may meet the objectives or constraints of the ATM system 110, the optimal solution may not meet objectives of one or more of the aircraft operators. To avoid wasting computing resources at the ATM system and causing unnecessary communications between the ATM and other parties, the ATM system calculates the several "near solutions" or "quasi-solutions" herein referred to as optimization solutions.

In some examples, the ATM system 110, using a genetic algorithm, operates by using multiple generations of large populations of potential solutions. With each generation, the distribution of objective functions within the population is better, (i.e., there are more "good"/"better" solutions), and the details of each of the good solutions at a given generation is known. Thus, at the final generation, there are a plurality of "good" solutions available and, where each solution is fully-defined (i.e., each aircraft has an assignment). For the flight path optimization problem, the final generation includes multiple flight paths assignment options for the aircraft related to the aircraft providers where each flight path assignment option assigns a flight path to each aircraft for the aircraft providers 350a-305n.

In some examples, the ATM system 110 calculates the optimization solutions until further solutions are not possible. For example, the final generation of flight path solutions includes all possible solutions that do not violate the constraints and objectives of the ATM system 110. In another example, time is a limiting factor for the calculations. For example, aircraft operators 305a-305n may provide the flight plan requests 315a—315n within a time window prior to aircraft takeoff or entering the airspace 120, or provides the request upon detecting the airspace event 125. In some examples, in order to ensure the time window for the aircraft does not expire or that the airspace event 125 may be avoided by aircraft in flight, the ATM system 110 limits the time allotted to calculate optimization solutions at step 320.

Once the time allotted by the ATM system 110 for step 120 has elapsed or there are no more possible solutions to be calculate (as discussed above), the ATM system 110 provides optimization solutions 325a-325n to the aircraft operators 305a-305n at step 330.

At step 340, the aircraft operators 305a-305n select options and rank the various solutions provide in the optimization solutions 325a-325n. For example, the aircraft operator 305a selects and ranks solutions provided in the optimization solution 325a according to various objectives and parameters of the aircraft operator for the aircraft 101a and its flight operations. Each aircraft operator may analyze the operational attractiveness (e.g., total operator network profitability and/or robustness) for each of the solutions provided in the optimization solutions 325-325n. In some examples, the aircraft operators utilize complex cost functions where the cost of each flight depends on the operational details of other flights, with which it exchanges resources (aircraft, crew) and/or payload (passengers, cargo) or conflicts for use of ground resources (gates, ground crew) to determine the overall profitability/feasibility of the entire solution. This review and ranking by the aircraft operator may also depend on mitigation to infeasibilities in the proposed solution (crew connectivity, ground resource over commitment, etc.).

In some examples, a time allowed to the aircraft operators to complete the step 340 is mandated by the ATM system 110 and provided in the optimization solutions 325a-325c in order to allow for the ATM system 110 to complete the steps 360 and 370 prior to a time window expiring for assignment of resources to be made to the aircraft operators 305a-305n.

At step 350, the ATM system 110 receives ranked selections 345a-345n from the aircraft operators. The ranked selections 345a-345n may be similar to the ranked selection 250 described in FIG. 2, where each ranked selection includes a list of preferred optimization solutions provided to the aircraft operator and ranked in the step 340. At step 360, the ATM system 110 assigns resources to the aircraft operators 305a-305n based on a highest ranked optimization solution of the plurality of optimization solutions received in the ranked selections 345a-345n. For example, the ATM system 110 selects the optimization solution calculated in the step 320 that has the highest overall ranking amongst the aircraft operator 305a-305n based on the ranked selections 345a-345n.

Figure 4:
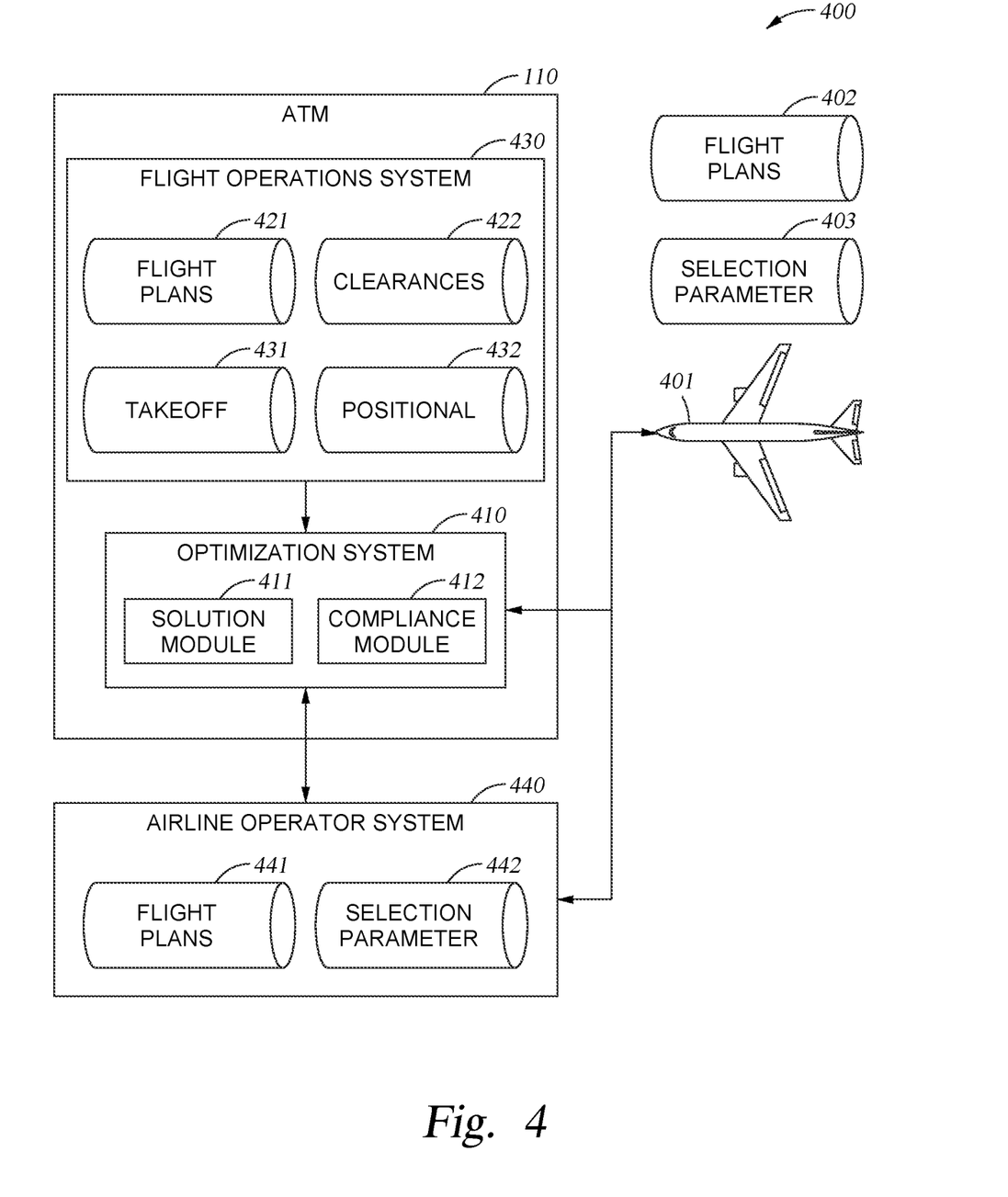
FIG. 4 illustrates a data processing architecture, according to aspects of the present disclosure.

In some examples, the ATM system 110 may process the ranked selections 345a-345n prior to determining a highest overall or consensus ranking. For example, the lowest ranked optimization solution from each aircraft operators are removed from the potential group of solutions prior to averaging the ranking. The ATM system 110 assigns the resources including the airspace for flight paths and time from the highest ranked solution to the aircraft operators 305a-305n. The ATM system 110 provides assignments 365 to the aircraft operators 305a-305n, where the flight assignments include assignments for the associated aircraft to conduct flight operations according to the selected optimized solution in the airspace 120 such as described in relation to FIG. 1C. FIG. 4 illustrates a data processing architecture 400, according to aspects of the present disclosure. To assign resources to various requesting entities while avoid conflicts among the entities, optimization system 410, receives various resource requests, such as flight plan request and routes available to an aircraft 401 and calculates and assigns an optimized solution to the aircraft 401, such as the aircraft described above in relation to FIGS. 1A-3.

The optimization system 410 is in communication with the aircraft 401, including at least the aircraft 101a-101c described in relation to FIGS. 1A-3, a flight operations system 430, and an airline operator system 440 in this example. Each of the aircraft 401, optimization system 410, flight operations system 430, and airline operator system 440 are representative of or include one or more computing devices, such as those described in relation to FIG. 6, that process and store various data, and operations of the optimization system 410 may be performed on dedicated hardware or as part of a cloud computing environment in various aspects. Although the aircraft 401, optimization system 410, flight operations system 430, and airline operator system 440 are illustrated as single systems, in various aspects, the optimization system 410 is in communications with several instances of each, and each instance may provide some or all of the associated data in different aspects.

The aircraft 401 and/or the airline operator system 440 provides the optimization system 410 with flight plan data 402 and 441 for the aircraft 401. The flight plan data 402 can at least indicate a base requested flight plan including current planned routes for the aircraft 401 as well as predicted aircraft paths and times from various onboard aircraft systems. The selection parameters 403 and 442 may include various parameters for selecting and ranking optimization solutions provided by the optimization system 410.

The flight operations system 430, which can include local air traffic controller systems, remote air traffic controller systems as well as regional, national, or global navigation and tracking systems provides takeoff data 431 and positional data 432 for the aircraft in the controlled airspace such as the airspace 120 in FIGS. 1A-C. In various aspects, the takeoff data 431 includes scheduled times and aircraft queued for takeoff. The positional data 432 can include (ground-related) ADS-B (Automatic Dependent Surveillance—Broadcast) data for where aircraft 401 are located. The positional data 432 may also include current aircraft positions for the aircraft 401 provided via System Wide Information Management (SWIM). The flight operations system 430 can also include flight plans 421. These flight plans may include both flight plan request and assigned flight plans as described herein for the aircraft 401, which includes flight plans filed with air traffic controller systems, as well as clearances 422, which includes clearances for each of the aircraft 401.

The airline operator system 440 also provides the optimization system 410 with flight plans 441. The flight plans 441 specify information about the aircraft 401 controlled by the specific airline and may also include a number of passengers, a crew manifest (including duty times and "home" airports), departure and estimated time of arrival (ETA) times for a currently scheduled flight, information related to a next scheduled flight, etc., as well as baseline requested flight plans for each of the scheduled flights. The selection parameters 442 specify various constraints for the aircraft 401 including limits to flight route variations as well as constraints that may affect optimization selection by the airline operator system 440 such as scheduling and other limitations.

The optimization system 410 receives the data from the other systems to perform optimization solution calculation and assignment, and to communicate those decisions back to the various systems for further processing and analysis. For example, the optimization solutions and the assigned resources/flight plans for the aircraft 401 are provided back to the aircraft 401 as well as other potential flight implementers such as the airline operator system 440 and the flight operations system 430.

The optimization system 410 includes a solution module 411, which uses received flight plan requests to calculate various optimization solutions for assigning the aircraft 401 a flight path within the controlled airspace. The compliance module 412, verifies that the proposed flight plans and solutions are compatible with airspace constraints and other air traffic controlled by the flight operations system 430, etc. In some examples, the flight operations system 430 and the optimization system form the ATM system 110 as described herein.

Figure 5:
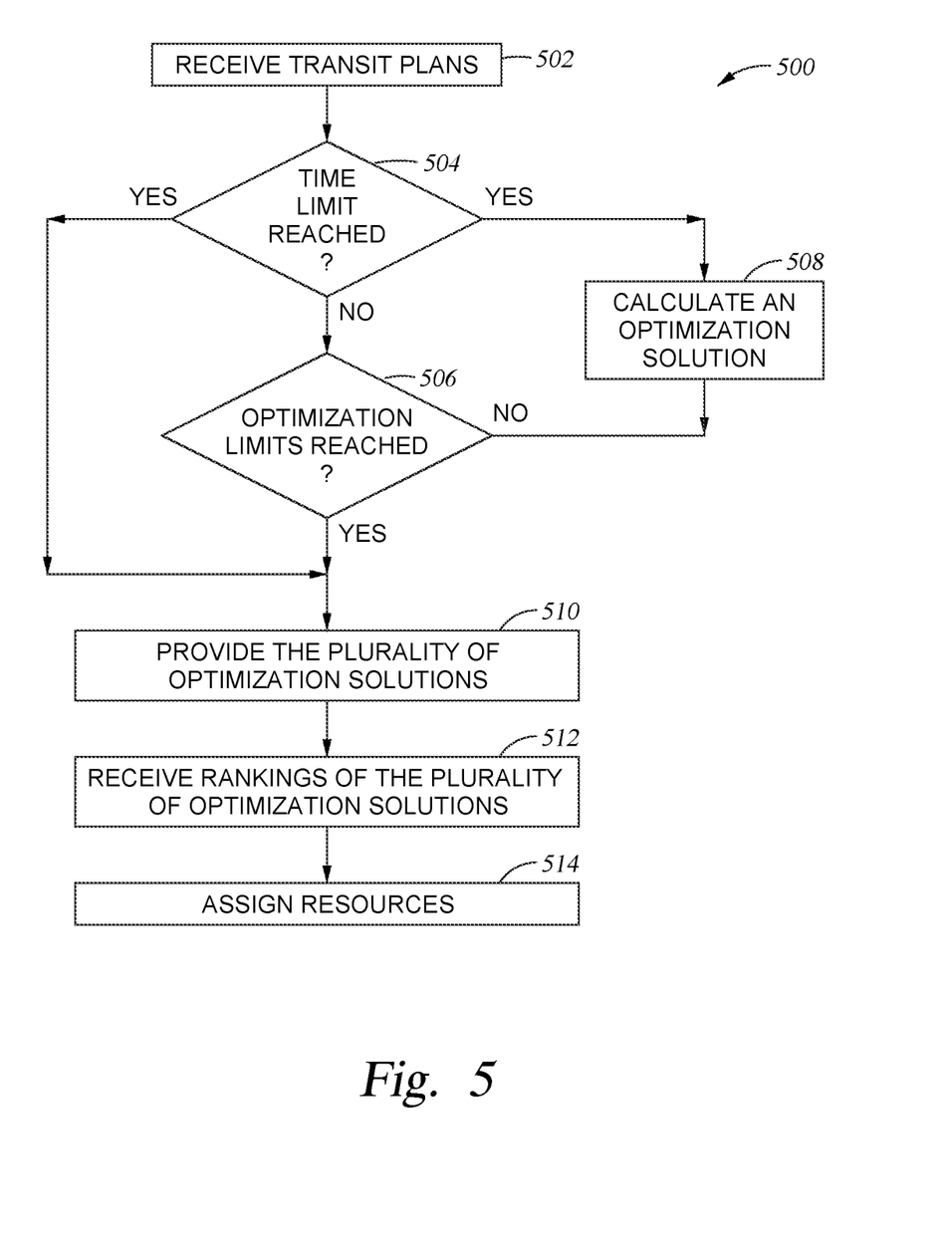
FIG. 5 is a flowchart of a method for collaborative traffic management, according to aspects of the present disclosure.

FIG. 5 is a flowchart of a method 500 for collaborative traffic management, according to aspects of the present disclosure.

The method 500 begins at block 502 where the ATM system 110 receives at least first transit requests from a first entity and second transit requests from a second entity. In some examples, the first transit request and the second transit request conflict or otherwise request access to the same limited resource at a same or similar time. For example, as described in relation to FIGS. 1A and 3, the ATM system 110 receives the flight plan requests 105a-105n or the flight plan requests 315a-315n. In some examples, the flight plan requests are received at the ATM system 110 in response to a disrupting event affecting a pre-existing assignment plan. For example, the airspace event 125, in FIG. 1A, causes the aircraft 101a-101n to request a change to preexisting assigned flight path. In some examples, the first transit requests or flight plan request suggest adjustments to resources under control of the first entity affected by the disrupting event and the second transit requests suggest adjustments to resources under control of the second entity affected by the disrupting event. For example, the flight plan requests include a change to the airspace and flight paths assigned to the respective aircraft.

As discussed above, the plurality of optimization solutions for the flight plan request may be subject to a time constraint or time limit. For example, based on the airspace event 125 or for pre-existing assignment needs from the aircraft 101a-101n, the ATM system 110 may need to calculate optimization solutions for only a specific given time.

At block 504, the ATM system 110 determines whether a time limit for calculating optimization solutions for the transit plans has elapsed or otherwise been reached. When the time limit has not been reached, method 500 proceeds to block 506, where the ATM determines whether optimization limits in the optimization solutions have been reached. For example, the ATM system 110, using various metrics may determine that a final generation for an optimization function has been reached or that further solutions will not increase the efficiency of the solved solutions. In an example where additional solutions are possible, method 500 proceeds to block 508.

At block 508, the ATM system 110 calculates a plurality of optimization solutions based on at least the first transit requests and the second transit requests to resolve the conflict. In some examples, the plurality of optimizations solutions are different solutions for one optimization function. For example, the ATM system 110 utilizes one function such as a genetic algorithm to calculate a solution for the conflict using the received transit requests (flight plan requests). In another example, the plurality of optimizations solutions are solutions from a corresponding plurality of optimization functions. For example, the ATM system 110 may calculate a first set of solutions using a first function and second set of solutions using a second function. In some examples, optimization solutions include fully resolved solutions where each request is assigned resources (e.g., airspace in a flight path, etc.) in each of the optimization solutions.

When either the time limit is reached or elapsed as determined in block 504 or the optimization limit has been reached as described in block 506, method 500 proceeds to block 510. At block 510, the ATM system 110 provides the plurality of optimization solutions to at least the first entity and the second entity. For example, as described in relation to FIG. 3, the ATM system 110 provides optimization solutions 325a-325n to the aircraft operators 305a-305n. The aircraft operators, in turn, rank and select choices from the optimization solutions. In some examples, the aircraft operator system may rank the selections according to a first preference schema and the aircraft operator 305b may rank their selections using a second preference schema.

At block 512, the ATM system 110 receives at least first ranked selections of the plurality of optimization solutions from at least the first entity and second ranked selections of the plurality of optimization solutions from the second entity. For example, the ATM system 110 receives the selections 345a-345n as described in relation to FIG. 3.

At block 514, the ATM system 110 assigns resources to the first entity and the second entity based on a highest ranked optimization solution of the plurality of optimization solutions according to a combination of the first ranked selections and the second ranked selections. For example, the ATM system 110 may combine the selections using a ranked choice voting schema or other schema as described in relation to step 360 of FIG. 3.

Figure 6:
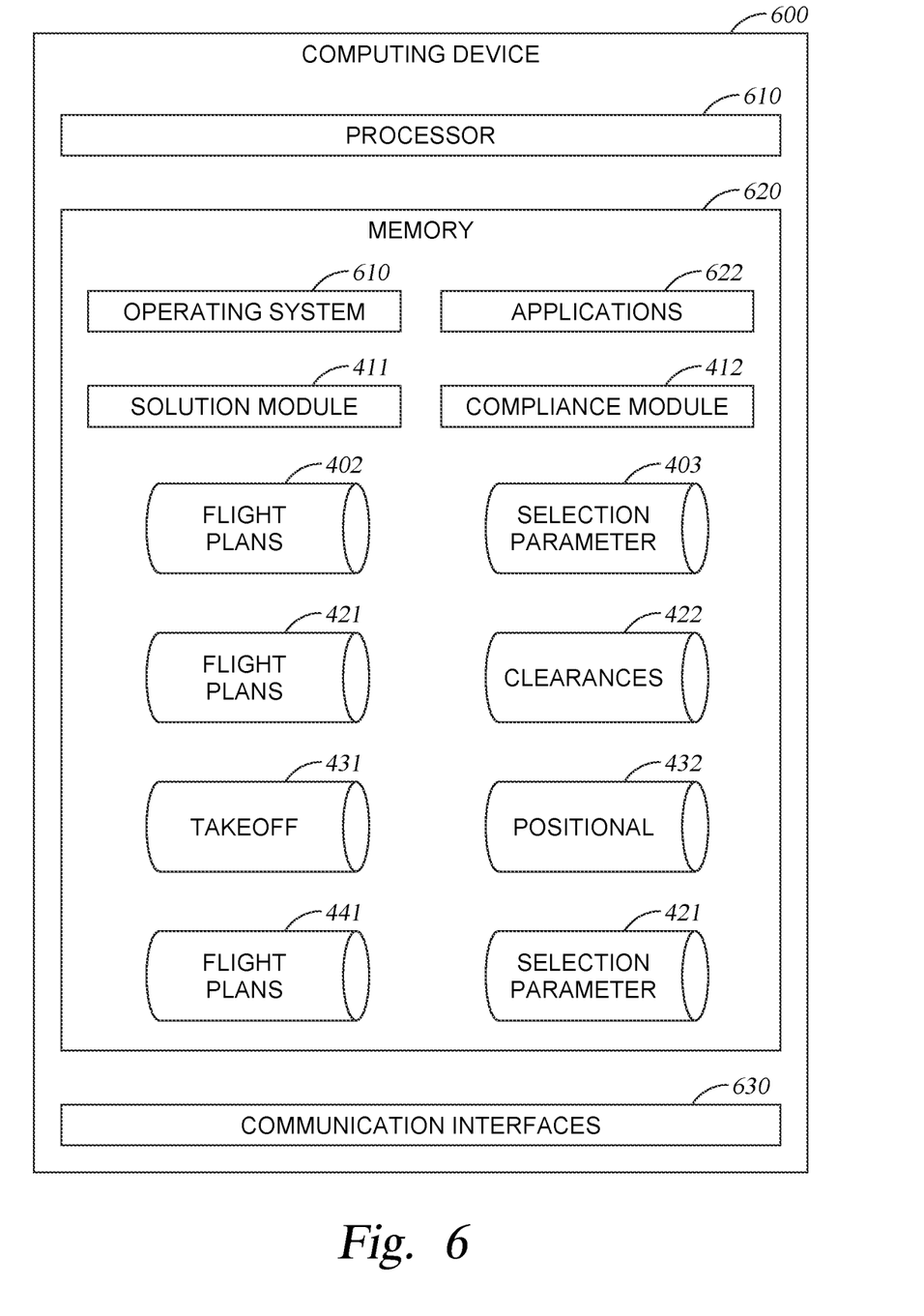
FIG. 6 illustrates a computing device, according to aspects of the present disclosure.

FIG. 6 illustrates example computing components of a computing device 600 or other processing system as may be used to provide collaborative traffic management as described in the present disclosure by one or more of the ATM system 110, and/or an onboard computer for an aircraft 401.

The computing device 600 includes a processor 610, a memory 620, and an interface 630. The processor 610 and the memory 620 provide computing functionality to run various programs and/or operations for the computing device 600, including the storage and retrieval of the various data described herein.

The processor 610, which may be any computer processor capable of performing the functions described herein, executes commands based on inputs received from a user and the data received from the interface 630.

The interface 630 connects the computing device 600 to external devices, such as, for example, external memory devices, external computing devices, a power source, a wireless transmitter, etc., and may include various connection ports (e.g., Universal Serial Bus (USB), Firewire, Ethernet, coaxial jacks) and cabling. The interface 630 is used to send and receive between computing devices and to communicate alerts (including go, no-go, and caution alerts) to aircraft 401 and the operators thereof.

The memory 620 is a memory storage device that generally includes various processor-executable instructions, that when executed by the processor 610, perform the various functions related to informed de-icing discussed herein. The processor-executable instructions may generally be described or organized into various "applications" or "modules" in the memory 620, although alternate implementations may have different functions and/or combinations of functions. The memory 620 also generally includes data structures that store information for use by or output by the various applications or modules. In the present disclosure, the memory 620 includes at least instructions for an operating system 621 and one or more application(s) 622. The memory 620 may be one or more memory devices, such as, for example, Random Access Memory (RAM), Read Only Memory (ROM), flash memory, or any other type of volatile or non-volatile storage medium that includes instructions that the processor 610 may execute.

When the computing device 600 provides the functionality of the optimization system 410 (per FIG. 4 6), the memory 620 includes processor executable instructions to provide the functionalities thereof described in the present disclosure. In some aspects, the memory 620 includes databases for locally caching data for analysis by the solution module 411 and the compliance module 412, but can also use data maintained on and received via the interface 630 from a, a flight operations system, an airline operator system, and/or an aircraft including the takeoff data 431, flight plans 421, positional data 432, clearances 422, flight plans 441, selection parameters 442, flight plan data 402, and selection parameters 403, etc.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   receiving, at an air traffic management (ATM) system, first transit requests from a first aircraft and second transit requests from a second aircraft that include a conflict with the first transit requests;
   calculating a plurality of optimization solutions based on the first transit requests and the second transit requests to resolve the conflict;
   providing, from the ATM system, the plurality of optimization solutions, wherein the optimization solutions are based on predicted paths of the first aircraft and the second aircraft, to the first aircraft and the second aircraft;
   receiving first ranked selections of the plurality of optimization solutions from the first aircraft and second ranked selections of the plurality of optimization solutions from the second aircraft; and
   assigning resources to the first aircraft and the second aircraft based on a highest ranked optimization solution of the plurality of optimization solutions according to a combination of the first ranked selections and the second ranked selections.

2. The method of claim 1, wherein the first transit requests and the second transit requests are received in response to a disrupting event affecting a pre-existing assignment plan, wherein the first transit requests suggest adjustments to resources under control of the first aircraft affected by the disrupting event and the second transit requests suggest adjustments to resources under control of the second aircraft affected by the disrupting event.

3. The method of claim 2, wherein calculating the plurality of optimization solutions is performed under a time limit based on the disrupting event and the pre-existing assignment plan.

4. The method of claim 1, wherein the plurality of optimizations solutions are different solutions for one optimization function.

5. The method of claim 1, wherein the plurality of optimizations solutions are solutions from a corresponding plurality of optimization functions.

6. The method of claim 1, wherein the combination of the first ranked selections and the second ranked selections is performed via a ranked choice voting schema.

7. The method of claim 1, wherein the first ranked selections comprise selections from the first aircraft ranked according to a first preference schema and wherein the second ranked selections comprise selections from the second aircraft ranked according to a second preference schema.

8. A system, comprising:
   a processor;
   a memory storage device including instructions that when executed by the processor enable performance of an operation comprising:
   receiving, at an ATM system first transit requests from a first aircraft and second transit requests from a second aircraft that include a conflict with the first transit requests;
   calculating a plurality of optimization solutions, wherein the optimization solutions are based on predicted paths of the first aircraft and the second aircraft, based on the first transit requests and the second transit requests to resolve the conflict;
   providing, from the ATM system, the plurality of optimization solutions to the first aircraft and the second aircraft;
   receiving first ranked selections of the plurality of optimization solutions from the first aircraft and second ranked selections of the plurality of optimization solutions from the second aircraft; and
   assigning resources to the first aircraft and the second aircraft based on a highest ranked optimization solution of the plurality of optimization solutions according to a combination of the first ranked selections and the second ranked selections.

9. The system of claim 8, wherein the first transit requests and the second transit requests are received in response to a disrupting event affecting a pre-existing assignment plan, wherein the first transit requests suggest adjustments to resources under control of the first aircraft affected by the disrupting event and the second transit requests suggest adjustments to resources under control of the second aircraft affected by the disrupting event.

10. The system of claim 9, wherein calculating the plurality of optimization solutions is performed under a time limit based on the disrupting event and the pre-existing assignment plan.

11. The system of claim 8, wherein the plurality of optimizations solutions are different solutions for one optimization function.

12. The system of claim 8, wherein the plurality of optimizations solutions are solutions from a corresponding plurality of optimization functions.

13. The system of claim 8, wherein the combination of the first ranked selections and the second ranked selections is performed via a ranked choice voting schema.

14. The system of claim 8, wherein the first ranked selections comprise selections from the first aircraft ranked according to a first preference schema and wherein the second ranked selections comprise selections from the second aircraft ranked according to a second preference schema.

15. A computer program product, the computer program product comprising:
a non-transitory computer-readable storage medium having computer-readable program code embodied therewith, the computer-readable program code executable by one or more computer processors to perform an operation, the operation comprising:
receiving, at an ATM system, first transit requests from a first aircraft and second transit requests from a second aircraft that include a conflict with the first transit requests;
calculating a plurality of optimization solutions, wherein the optimization solutions are based on predicted paths of the first aircraft and the second aircraft, based on the first transit requests and the second transit requests to resolve the conflict;
providing the plurality of optimization solutions to the first aircraft and the second aircraft;
receiving first ranked selections of the plurality of optimization solutions from the first aircraft and second ranked selections of the plurality of optimization solutions from the second aircraft; and
assigning resources to the first aircraft and the second aircraft based on a highest ranked optimization solution of the plurality of optimization solutions according to a combination of the first ranked selections and the second ranked selections.

16. The computer program product of claim 15, wherein the first transit requests and the second transit requests are received in response to a disrupting event affecting a pre-existing assignment plan, wherein the first transit requests suggest adjustments to resources under control of the first aircraft affected by the disrupting event and the second transit requests suggest adjustments to resources under control of the second aircraft affected by the disrupting event.

17. The computer program product of claim 15, wherein the plurality of optimizations solutions are different solutions for one optimization function.

18. The computer program product of claim 15, wherein the plurality of optimizations solutions are solutions from a corresponding plurality of optimization functions.

19. The computer program product of claim 15, wherein the combination of the first ranked selections and the second ranked selections is performed via a ranked choice voting schema.

20. The computer program product of claim 15, wherein the first ranked selections comprise selections from the first aircraft ranked according to a first preference schema and wherein the second ranked selections comprise selections from the second aircraft ranked according to a second preference schema.

* * * * *